United States Patent
Sung et al.

(10) Patent No.: US 8,848,678 B2
(45) Date of Patent: Sep. 30, 2014

(54) METHOD OF PERFORMING HARQ IN WIRELESS COMMUNICATION SYSTEM

(75) Inventors: Doo Hyun Sung, Seoul (KR); Han Gyu Cho, Seoul (KR); Sung Ho Moon, Seoul (KR)

(73) Assignee: LG Electronics Inc., Seoul (KR)

( * ) Notice: Subject to any disclaimer, the term of this patent is extended or adjusted under 35 U.S.C. 154(b) by 439 days.

(21) Appl. No.: 12/922,670

(22) PCT Filed: Mar. 17, 2009

(86) PCT No.: PCT/KR2009/001345
§ 371 (c)(1),
(2), (4) Date: Sep. 14, 2010

(87) PCT Pub. No.: WO2009/116790
PCT Pub. Date: Sep. 24, 2009

(65) Prior Publication Data
US 2011/0013613 A1 Jan. 20, 2011

Related U.S. Application Data

(60) Provisional application No. 61/037,299, filed on Mar. 17, 2008, provisional application No. 61/045,946, filed on Apr. 17, 2008, provisional application No. 61/046,773, filed on Apr. 21, 2008.

(51) Int. Cl.
*H04W 4/00* (2009.01)
*H04L 1/18* (2006.01)

(52) U.S. Cl.
CPC ............ *H04L 1/1887* (2013.01); *H04L 1/1812* (2013.01)
USPC ........................................ 370/338

(58) Field of Classification Search
CPC .......................... H04L 15/0007; H04L 1/1896
See application file for complete search history.

(56) References Cited

U.S. PATENT DOCUMENTS

| | | | |
|---|---|---|---|
| 2005/0201319 A1 | 9/2005 | Lee et al. | |
| 2005/0201325 A1 | 9/2005 | Kang et al. | |
| 2006/0018258 A1* | 1/2006 | Teague et al. | 370/236 |
| 2006/0195767 A1 | 8/2006 | Ihm et al. | |
| 2007/0230412 A1* | 10/2007 | McBeath et al. | 370/338 |

(Continued)

FOREIGN PATENT DOCUMENTS

| | | | |
|---|---|---|---|
| CN | 1933366 | 3/2007 | |
| CN | 101091339 | 12/2007 | |
| WO | WO 2008127183 A2 * | 10/2008 | H04L 1/18 |

OTHER PUBLICATIONS

State Intellectual Property Office of the People's Republic of China Application Serial No. 200980109646.0, Office Action dated Nov. 5, 2012, 6 pages.

(Continued)

*Primary Examiner* — Asad Nawaz
*Assistant Examiner* — Jason Harley
(74) *Attorney, Agent, or Firm* — Lee, Hong, Degerman, Kang & Waimey

(57) ABSTRACT

A method of performing hybrid automatic repeat request (HARQ) in a wireless communication system is provided. The method includes receiving a system configuration signal, the system configuration signal comprising frame configuration information and HARQ delay information, receiving a downlink (DL) signal in a DL subframe and transmitting an acknowledgement (ACK)/not-acknowledgement (NACK) signal for the DL signal in a UL subframe.

5 Claims, 10 Drawing Sheets

(56) References Cited

U.S. PATENT DOCUMENTS

2008/0039133 A1* 2/2008 Ma et al. .................. 455/552.1
2008/0170634 A1 7/2008 Kwak et al.
2008/0304447 A1 12/2008 Kim et al.
2009/0181689 A1 7/2009 Lee et al.
2009/0219875 A1* 9/2009 Kwak et al. ................ 370/329
2010/0074153 A1* 3/2010 Torsner et al. ............. 370/280

OTHER PUBLICATIONS

The State Intellectual Property Office of the People's Republic of China Application Serial No. 200980109646.0, Patent Certificate dated Oct. 16, 2013, 31 pages.

* cited by examiner

METHOD OF PERFORMING HARQ IN WIRELESS COMMUNICATION SYSTEM

CROSS-REFERENCE TO RELATED APPLICATIONS

This application is the National Stage filing under 35 U.S.C. 371 of International Application No. PCT/KR2009/001345, filed on Mar. 17, 2009, which claims the benefit of U.S. Provisional Application Ser. Nos. 61/037,299, filed on Mar. 17, 2008, 61/045,946, filed on Apr. 17, 2008, and 61/046,773, filed on Apr. 21, 2008, the contents of which are all hereby incorporated by reference herein in their entirety.

TECHNICAL FIELD

The present invention relates to a wireless communication, and more particularly, to a method of performing HARQ in a wireless communication system.

BACKGROUND ART

IEEE (Institute of Electrical and Electronics Engineers) 802.16 standard provides techniques and protocols for supporting broadband wireless access. The standardization had been conducted since 1999 until the IEEE 802.16-2001 was approved in 2001. The IEEE 802.16-2001 is based on a physical layer of one carrier (SC) called 'WirelessMAN-SC'. The IEEE 802.16a standard was approved in 2003. In the IEEE 802.16a standard, 'WirelessMAN-OFDM' and 'WirelessMAN-OFDMA' are further added to the physical layer in addition to the 'WirelessMAN-SC'. After completion of the IEEE 802.16a standard, the revised IEEE 802.16-2004 standard was approved in 2004. To correct bugs and errors of the IEEE 802.16-2004 standard, the IEEE 802.16-2004/Cor1 was completed in 2005 in a format of 'corrigendum'. A standard based on IEEE 802.16-2004/Cor1 is referred to as IEEE 802.16e or WiMAX.

Recently, IEEE 802.16 broadband wireless access working group has standardized a new technical standard IEEE 802.16m based on IEEE 802.16e. The newly developed IEEE 802.16m should be designed such that it can support the previously designed IEEE 802.16e. That is, the newly designed system IEEE 802.16m shall be composed to operate under efficiently covering the existing system IEEE 802.16e. This is referred to as backward compatibility.

Techniques of improving reliability of wireless communication include ARQ (Automatic Repeat Request). The ARQ allows a transmitter to retransmit a data signal when a receiver fails in receiving the data signal. Furthermore, there is HARQ (Hybrid Automatic Repeat Request) corresponding to a combination of FEC (Forward Error Correction) and ARQ. A receiver using HARQ attempts error correction on a received data signal and determines whether the data signal is retransmitted using an error detection code. The error detection code may use CRC (Cyclic Redundancy Check). The receiver determines that the data signal has been successfully decoded when any error in the data signal is not detected through a CRC detection process. In this case, the receiver transmits an ACK (Acknowledgement) signal to a transmitter. The receiver determines that the data signal has not been decoded when an error in the data signal is detected through the CRC detection process. In this case, the receiver transmits a NACK (Not-acknowledgement) signal to the transmitter.

As described above, the HARQ is an important technique for improving the reliability of wireless communication. To perform HARQ, the time when a data signal is transmitted or received and the time when a HARQ ACK/NACK signal with respect to the data signal is transmitted or received are important issues. Accordingly, there is a need for a method of efficiently performing HARQ in a wireless communication system.

DISCLOSURE OF INVENTION

Technical Problem

The present invention provides a method of performing HARQ in a wireless communication system.

Technical Solution

In one aspect, a method of performing hybrid automatic repeat request (HARQ) in a wireless communication system, carried in a mobile station (MS), is provided. The method includes receiving a system configuration signal, the system configuration signal comprising frame configuration information and HARQ delay information, wherein the frame configuration information comprises a ratio of a plurality of downlink (DL) subframes to at least one uplink (UL) subframe in a frame, the DL subframes and the at least one UL subframe are allocated at different time in the frame, and the HARQ delay information comprises association between a UL subframe and at least one DL subframe for HARQ, wherein every UL subframe in the frame is associated with at least one DL subframe, receiving a DL signal in a DL subframe and transmitting an acknowledgement (ACK)/not-acknowledgement (NACK) signal for the DL signal in a UL subframe which is associated with the DL subframe in which the DL signal is received.

In another aspect, an apparatus for a wireless communication is provided. The apparatus includes a radio frequency (RF) unit configured to receive and transmit a radio signal and a processor coupled with the RF unit and configured to receive a system configuration signal, the system configuration signal comprising frame configuration information and HARQ delay information, wherein the frame configuration information comprises a ratio of a plurality of DL subframes to at least one UL subframe in a frame, the DL subframes and the at least on UL subframe are allocated at different time in the frame, and the HARQ delay information comprises association between a UL subframe and at least one DL subframe for HARQ, wherein every UL subframe in the frame is associated with at least one DL subframe, receive a DL signal in a DL subframe and transmit an ACK/NACK signal for the DL signal in a UL subframe which is associated with the DL subframe in which the DL signal is received.

Advantageous Effects

There is provided a method of performing HARQ in a wireless communication system. Accordingly, the entire performance of a system can be improved.

MODE FOR THE INVENTION

Technologies described below can be used for various wireless communication systems such as CDMA (Code division multiple access), FDMA (frequency division multiple access), TDMA (time division multiple access), OFDMA (orthogonal frequency division multiple access) and SC-FDMA (single carrier-frequency division multiple access). CDMA can be implemented by radio technology such as UTRA (Universal Terrestrial Radio Access) or CDMA2000. TDMA can be implemented by radio technology such as GSM (Global System for Mobile communication)/GPRS (General Packet Radio Service)/EDGE (Enhanced Data Rates for GSM Evolution). OFDMA can be implemented by radio technology such as IEEE (Institute of Electrical and Electronics Engineers) 802.11 (Wi-Fi), IEEE 802.16 (WiMAX) and IEEE 802.20, E-UTRA (Evolved UTRA). UTRA is a part of UMTS (Universal Mobile Telecommunication System). 3GPP (3rd Generation Partnership Project) LTE (Long Term Evolution) is a part of E-UMTS (Evolved UMTS) using E-UTRA, adopts OFDMA for downlink and adopts SC-FDMA for uplink. IEEE 802.16m is an evolved version of IEEE 802.16e.

For clarity, the following description will focus on IEEE 802.16m. However, technical features of the present invention are not limited thereto.

Figure 1:
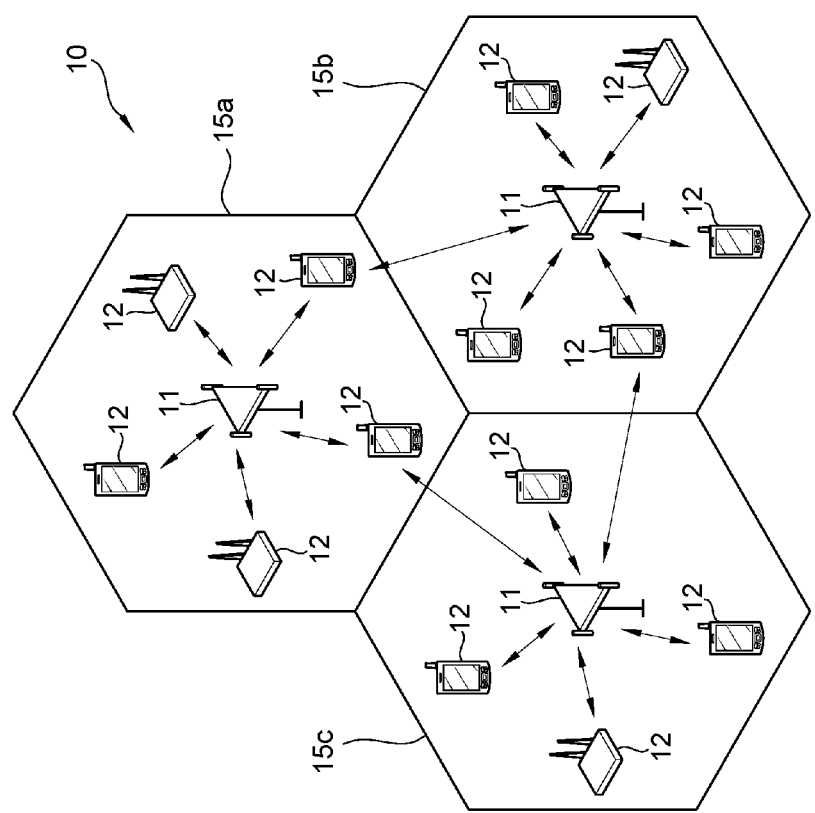
FIG. 1 illustrates a wireless communication system.

FIG. 1 illustrates a wireless communication system.

Referring to FIG. 1, a wireless communication system 10 includes at least one base station (BS) 11. Each BS 11 provides a communication service to a specific geographical area (generally referred to as a cell) 15a, 15b or 15c. Each cell can be divided into a plurality of regions (referred to as sectors). A mobile station (MS) 12 can be fixed or movable and referred to as terminology such as user equipment (UE), user terminal (UT), subscriber station (SS), wireless device, personal digital assistant (PDA), wireless modem, handheld device, etc. The BS 11 is a fixed station which communicates with the MS 12 and can be referred to as other terminology such as evolved-NodeB (eNB), base transceiver system (BTS), access point, etc.

Hereinafter, a downlink (DL) represents a communication link from a BS to an MS and an uplink (UL) represents a communication link from the MS to the BS. A transmitter may be a part of the BS and a receiver may be a part of the MS in the downlink. A transmitter may be a part of the MS and a receiver may be a part of the BS in the uplink.

A wireless communication system may use any duplex method, such as a Time Division Duplex (TDD) method, a Frequency Division Duplex (FDD) method, or a Half-duplex FDD (H-FDD) method. In the TDD method, UL transmission and DL transmission are performed at different time while occupying the same frequency band. In the FDD method, UL transmission and DL transmission are simultaneously performed while occupying different frequency bands. In the H-FDD method, UL transmission and DL transmission cannot be simultaneously performed while occupying different frequency bands. That is, in the H-FDD method, UL transmission and DL transmission are performed in different frequency bands and at different time. Both of IEEE 802.16m system and IEEE 802.16e system support the TDD method.

Although the following description will focus on the TDD method, the technical features of the present invention can be also applied to the H-FDD method.

Figure 2:
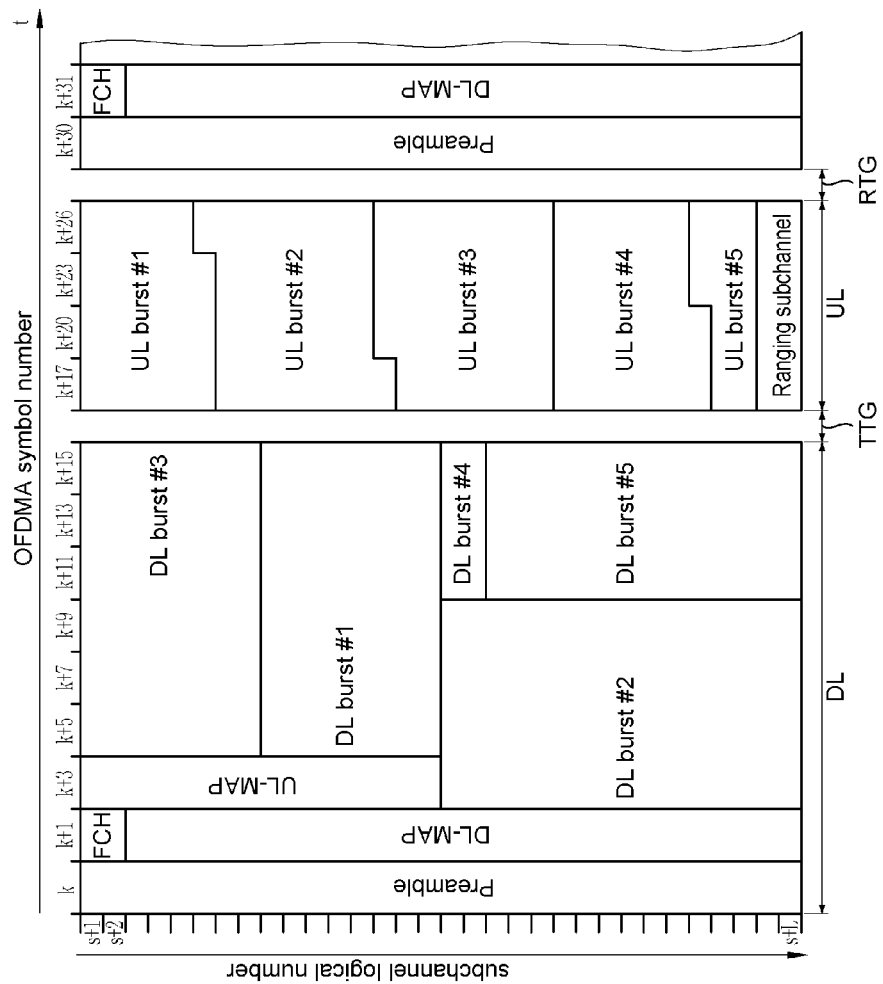
FIG. 2 illustrates an example of the structure of a frame in IEEE 802.16e system.

FIG. 2 illustrates an example of the structure of a frame in the IEEE 802.16e system. The frame is a data sequence for a fixed time, used according to physical specifications. A time axis may correspond to OFDMA symbols. A logical subchannel includes a plurality of subcarriers. Permutation is mapping of a logical subchannel to a physical subcarrier.

Referring to FIG. 2, the frame includes a downlink subframe and an uplink subframe. The downlink subframe is temporally prior to the uplink subframe. The downlink subframe sequentially includes a preamble, an FCH (Frame Control Header), a DL-MAP, an UL-MAP and a DL burst region. The uplink subframe includes UL bursts. Guard times are provided to identify the uplink subframe and the downlink subframe and are inserted to a middle portion (between the downlink subframe and the uplink subframe) and a last portion (next to the uplink subframe) of the frame. A transmit/receive transition gap (TTG) is a gap between a DL burst and a subsequent UL burst. A receive/transmit transition gap (RTG) is a gap between a UL burst and a subsequent DL burst.

The preamble is used for initial synchronization of the BS and the MS, cell search, and frequency offset and channel estimation. The FCH includes information on the length of the DL-MAP message and coding scheme of the DL-MAP.

The DL-MAP is a region for transmitting the DL-MAP message. The DL-MAP message defines access to a downlink channel. That is, the DL-MAP message defines the downlink channel instruction and/or control information. The UL-MAP is a region for transmitting an UL-MAP message. The UL-MAP message defines access to an uplink channel. That is, the UL-MAP message defines the uplink channel instruction and/or control information.

The DL burst is a region for transmitting data from the BS to the MS. The UL burst is a region for transmitting data from the MS to the BS.

Figure 3:
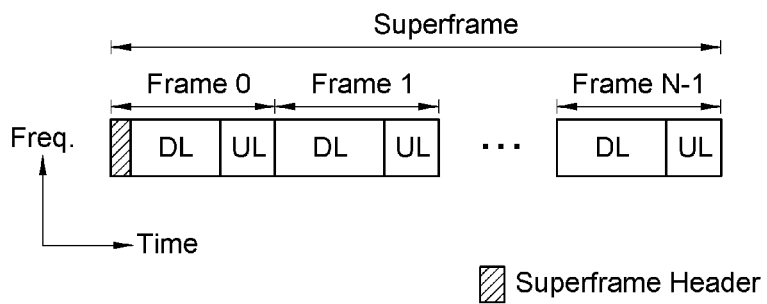
FIG. 3 illustrates an example of the structure of a superframe in the IEEE 802.16m system.

FIG. 3 illustrates an example of the structure of a superframe in the IEEE 802.16m system.

Referring to FIG. 3, the superframe includes a superframe header and N frames Frame 0, Frame 1, . . . , the Frame N−1. Here, N is a natural number. Each frame in the superframe includes a downlink region (indicated by DL) and an uplink region (indicated by UL).

The superframe may have a fixed length and the each frame included in the superframe may have the same length. For example, the superframe may have a length of 20 ms and include 4 frames. The each of 4 frames may have a length of 5 ms.

One frame may include a plurality of subframes. For example, one frame may include 8 subframes. Each subframe may be used for downlink transmission or uplink transmission. Each of the downlink region and the uplink region may be contiguous subframes. Hereinafter, a subframe for downlink transmission is referred to as a downlink subframe and a subframe for uplink transmission is referred to an uplink subframe. At least one subframe in the frame may be an uplink subframe. At least one subframe in the frame may be a downlink subframe. TTG (transmit/receive transition gap)/RTG (receive/transmit transition Gap) which is an idle time for conversion from uplink to downlink or conversion from downlink to uplink is arranged between the downlink subframe and the uplink subframe. The TTG/RTG may be referred to as a switching point or an idle symbol.

One subframe may include a plurality of OFDM (orthogonal frequency division multiplexing) symbols in the time domain and a plurality of subcarriers in the frequency domain.

The ratio of the downlink region to the uplink region (referred to as DL/UL ratio hereinafter) in the frame and the number of switching points in the frame are parameters which determine the frame configuration. The DL/UL ratio can be represented as the ratio of the number of downlink subframes to the number of uplink subframes or the ratio of the number of OFDM symbols included in the downlink region to the number of OFDM symbols included in the uplink region. The parameters can be combined in various manners and the frame configuration can be determined according to each combination of the parameters.

The number of OFDM symbols included in a subframe can depend on the length of CP (Cyclic Prefix). For example, type-1 subframe includes 6 OFDM symbols and type-2 subframe includes 7 OFDM symbols. All the subframes included in the frame may be type-1 subframes. Otherwise, each of the subframes in the frame may be type-1 subframe and type-2 subframe. The subframes in the frame may have the same number of OFDM symbol or different numbers of OFDM symbols. Otherwise, the number of OFDM symbols of at least one subframe in the frame may be different from the number of OFDM symbols of other subframes in the frame.

The superframe header may head the superframe. The superframe can be started with a downlink subframe including the superframe header. The superframe header includes a broadcast channel (BCH). The BCH carries system information. The system information is essential information that the MS must know in order to communicate with the BS. For example, the frequency bandwidth of a system corresponds to the system information. The system information includes an essential system parameter, system configuration information, etc. The system configuration information is a minimal set of time critical system configuration information. The essential system parameter is required for the MS to complete access in a power efficient manner. The BCH can be transmitted using a predetermined modulation and coding scheme. For example, the modulation scheme for BCH is QPSK (Quadrature Phase Shift Keying). The BCH can be transmitted within a predetermined frequency partition. For example, the BCH can occupy no more bandwidth than 5 MHz. The BCH can be divided into PBCH (Primary BCH) and SBCH (Secondary BCH). The PBCH can be transmitted for every superframe and the SBCH can be transmitted for every one or more superframes.

A subframe includes at least one frequency partition. A frequency partition is composed of at least one physical resource unit (PRU). The frequency partition may include a localized PRU and/or a distributed PRU. Each frequency partition may be used for different purposes such as fractional frequency reuse (FFR) or multicast and broadcast services (MBS).

The PRU which includes a plurality of contiguous OFDM symbols and a plurality of contiguous subcarriers is defined as a fundamental physical unit for resource allocation. The number of OFDM symbols included in the PRU may equal the number of OFDM symbols included in one subframe. For example, the PRU can include 18 subcarriers and 6 OFDM symbols when one subframe includes 6 OFDM symbols. A logical resource unit (LRU) is a basic logic unit for distributed resource allocation and localized resource allocation. The LRU is defined as a plurality of OFDM symbols and a plurality of subcarriers and includes pilots used in the PRU. Accordingly, the appropriate number of subcarriers in one LRU depends on the number of allocated pilots.

A logical distributed resource unit (DRU) may be used to obtain a frequency diversity gain. The DRU includes subcarrier groups distributed in one frequency partition. The DRU has the same size as the PRU. The smallest unit forming the DRU is one subcarrier.

A logical contiguous resource unit (CRU) may be used to obtain a frequency selective scheduling gain. The CRU includes localized subcarrier groups. The CRU has the same size as the PRU.

In the meantime, an MS to which the IEEE 802.16e system is applied (referred to as 16e MS hereinafter) and an MS to which the IEEE 802.16m system is applied (referred to as 16m MS hereinafter) may coexist in a cell. Hereinafter, a wireless communication system which supports both the 16e MS and the 16m MS is referred to as a 16e/16m system. A wireless communication system which supports only the 16m MS is referred to as a 16m system, and a wireless communication system which supports only the 16e MS is referred to as a 16e system. The 16e/16m system is needed because the 16m system should be designed such that it can support the 16e system. The 16e/16m system provides smooth communication services to even users who use the 16e MS. Furthermore, the 16e/16m system allows a service provider to reuse the existing equipment.

Figure 4:
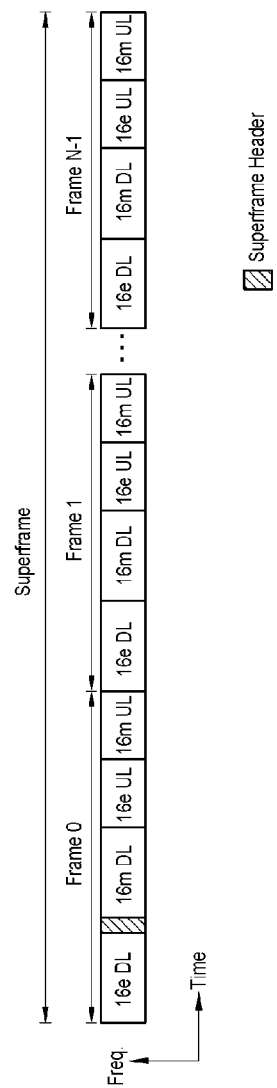
FIG. 4 illustrates an example of the structure of a superframe in the 16e/16m system.

FIG. 4 illustrates an example of the structure of a superframe in the 16e/16m system.

Referring to FIG. 4, the superframe includes N frames Frame 0, Frame 1, . . . , the Frame N−1. Here, N is a natural number. A downlink region includes a downlink region for 16e MS (referred to as 16e DL hereinafter) and a downlink region for 16m MS (referred to as 16m DL hereinafter) in each frame in the superframe. An uplink region includes an uplink region for the 16e MS (referred to as 16e UL hereinafter) and an uplink region for the 16m MS (referred to as 16m UL hereinafter) in each frame in the superframe. A superframe header may be located in the first 16m DL in the superframe.

Here, 16e DL and 16m DL in the downlink region are separated from each other in the time domain. That is, 16e DL and 16m DL are multiplexed according to TDM (Time Division Multiplexing). 16e UL and 16m UL in the uplink region are also multiplexed according to TDM. Otherwise, 16e DL and 16m DL may be multiplexed according to FDM (Frequency Division Multiplexing) to be separated from each other in the frequency domain. 16e UL and 16m UL may be multiplexed according to TDM, too. While the frame is arranged in the order of 16e DL, 16m DL, 16e UL and 16m UL in the time domain, it is exemplary. For example, the frame may be arranged in the order of 16e DL, 16m DL, 16m UL and 16e UL, arranged in the order of 16m DL, 16e DL, 16e UL and 16m UL or arranged in the order of 16m DL, 16e DL, 16m UL and 16e UL.

Figure 5:
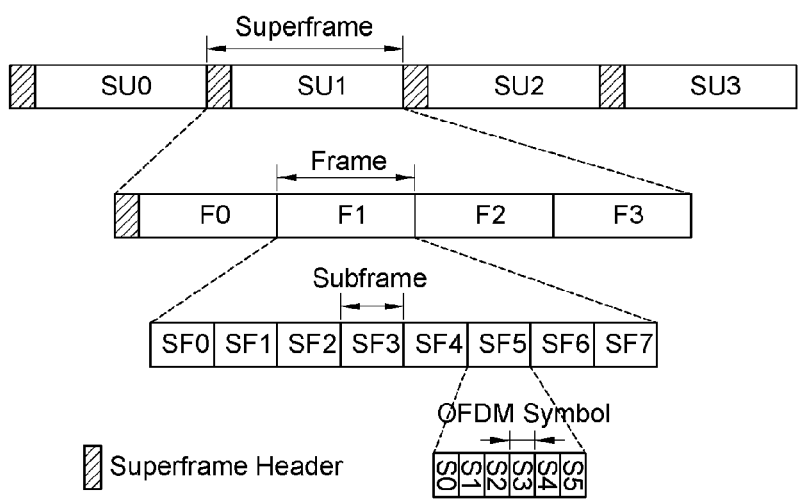
FIG. 5 illustrates an example of the structure of a superframe in a 16e/16m system or a 16m system.

FIG. 5 illustrates an example of the structure of a superframe in a 16e/16m system or a 16m system.

Referring to FIG. 5, the superframe includes a superframe header and 4 frames F0, F1, F2 and F3. A frame includes 8 subframes SF0, SF1, SF2, SF3, SF4, SF5, SF6 and SF7. Hereinafter, a SFn means the (n+1)th subframe in a frame for convenience of explanations. One subframe includes 6 OFDM symbols S0, S1, S2, S3, S4 and S5. Each subframe is a uplink subframe or a downlink subframe. Hereinafter, the following description is explained based on the structure of the superframe illustrated in FIG. 5 for convenience of explanations.

A DL/UL ratio, a multiplexing scheme between 16e DL and 16m DL, a multiplexing scheme between 16e UL and 16m UL, a ratio of 16e DL to 16m DL, and a ratio of 16e UL to 16m UL are parameters which determine a frame configuration. These parameters can be combined in various manners and the frame configuration can be determined according to each combination of the parameters.

Table 1 represents various combinations of the parameters determining the frame configuration.

TABLE 1

| | | | Details | |
|---|---|---|---|---|
| | Overall frame configuration | | 16c DL:16m DL:16c | |
| System | Multiplexing | DL:UL | UL:16m UL | |
| 16e/16m | DL TDM, UL TDM | a:b | w:x:y:z | |
| 16e/16m | DL TDM, UL FDM | a:b | w:x:y:z | |
| 16e/16m | DL FDM, UL TDM | a:b | w:x:y:z | |
| 16e/16m | DL FDM, UL FDM | a:b | w:x:y:z | |
| 16m | N/A | a:b | N/A | |

The overall frame configuration is classified according to the system and the multiplexing scheme. The system is the 16e/16m system or the 16m system. The 16e/16m system is further classified into four cases according to the multiplexing scheme. For example, 'DL TDM, UL FDM' represents that 16e DL and 16m DL are multiplexed according to TDM and 16e UL and 16m UL are multiplexed according to FDM.

The overall frame configuration is determined in detail according to the DL/UL ratio (DL:UL=a: b) and 16e DL/16m DL/16e UL/16m UL ratio (16e DL:16m DL:16e UL:16m UL=w:x:y:z). In Table 1, w:x:y:z is an example. w:x:y:z may be one of 16e DL:16m DL:16m UL:16e UL, 16m DL:16e DL:16e UL:16m UL and 16mDL:16e DL:16m UL:16e UL.

In the DL/UL ratio (DL:UL=a:b), a may represent the number of downlink subframes and b may represent the number of UL subframes. If a frame includes 8 subframes, a+b=8. Otherwise, a may denote the number of OFDM symbols included in the downlink region and b may denote the number of OFDM symbols included in the uplink region. If a frame includes 8 subframes and one subframe includes 6 OFDM symbols, a+b=48, a and b can have values in various combinations.

Each of various combinations of the parameters, shown in Table 1, will now be explained.

Firstly, the case where multiplexing is performed according to DL TDM and UL TDM in the 16e/16m system is explained. The order of aligning w, x, y and z corresponds to the sequence of the time domain. Here, each of a, b, w, x, y and z may be the number of subframes. a, b, w, x, y and z can be combined in various manners under the condition that satisfies a+b=8, w+x=a, y+z=b and a+b=w+x+y+z.

Secondly, the case where multiplexing is performed according to DL TDM and UL FDM in the 16e/16m system is explained. The order of aligning w, x and y (or z) corresponds to the sequence of the time domain. The order of aligning y and z corresponds to the sequence of frequency domain. Each of a, b, w and x may be the number of subframes. Each of y and z may be the number of PRUs. In this case, y+z corresponds to the overall number of PRUs. Otherwise, each of y and z may be a bandwidth ratio to the frequency bandwidth of the system. In this case, y+z=1. Otherwise, each of y and z may be frequency band. In this case, y+z corresponds to the frequency bandwidth of the system. a, b, w, x, y and z can be combined in various manners under the condition that satisfies y+z, a+b=8 and w+x=a.

Thirdly, the case where multiplexing is performed according to DL FDM and UL TDM in the 16e/16m system is explained. The order of aligning w (or x), y and z corresponds to the sequence of the time domain. The order of aligning w and x corresponds to the sequence of frequency domain. Each of a, b, y and z may be the number of subframes. Each of w and x may be the number of PRUs. In this case, w+x corresponds to the total number of PRUs. Otherwise, each of w and x may be a bandwidth ratio to the frequency bandwidth of the system. In this case, w+x=1. Otherwise, each of w and x may be frequency band. In this case, w+x corresponds to the frequency bandwidth of the system. a, b, w, x, y and z can be combined in various manners under the condition that satisfies w+x, a+b=8 and y+z=b.

Fourthly, the case where multiplexing is performed according to DL FDM and UL FDM in the 16e/16m system is explained. The order of aligning w (or x) and y (or z) corresponds to the sequence of the time domain and the order of aligning w and x (or y and z) corresponds to the sequence of frequency domain. Each of a and b may be the number of subframes. Each of w, x, y and z may be the number of PRUs. In this case, w+x and y+z corresponds to the total number of PRUs. Otherwise, each of w, x, y and z may be a bandwidth ratio to the frequency bandwidth of the system. In this case, w+x=1 and y+z=1. Otherwise, each of w, x, y and z may be frequency band. In this case, w+x and y+z correspond to the frequency bandwidth of the system. a, b, w, x, y and z can be combined in various manners under the condition that satisfies w+x, y+z and a+b=8.

Finally, the 16m system will be explained. Each of a and b may be the number of subframes. a and b can be combined in various manners under the condition that satisfies a+b=8. Furthermore, the frame configuration may be determined according to the number of switching points in the frame.

Table 2 represents an example of a frame configuration according to combinations of a and b when the number of switching points is 2.

TABLE 2

| a:b | Frame configuration |
|---|---|
| 7:1 | D, D, D, D, D, D, D, [s], U, [s] |
| 6:2 | D, D, D, D, D, D, \|s\|, U, U, \|s\| |
| 5:3 | D, D, D, D, D, [s], U, U, U, [s] |
| 4:4 | D, D, D, D, [s], U, U, U, U, [s] |
| 3:3 | D, D, D, [s], U, U, U, U, U, [s] |
| 2:6 | D, D, \|s\|, U, U, U, U, U, U, \|s\| |
| 1:7 | D, [s], U, U, U, U, U, U, U, [s] |

Here, 'D' denotes a downlink subframe, 'U' denotes an uplink subframe and [s] denotes a switching point.

Table 3 represents an example of a frame configuration according to combinations of a and b when the number of switching points is 4.

TABLE 3

| a:b | Frame configuration |
|---|---|
| 5:3 | D, D, [s], U, [s], D, D, D, [s], U, U, [s] |
| 4:4 | D, D, [s], U, U, [s], D, D, [s], U, U, [s] |

In addition, various frame configurations can be obtained according to the number of switching points and combinations of a and b.

An MS shall know the frame configuration of the system to communicate with a BS, and thus the BS shall inform the MS of frame configuration information that is information on the frame configuration.

Figure 6:
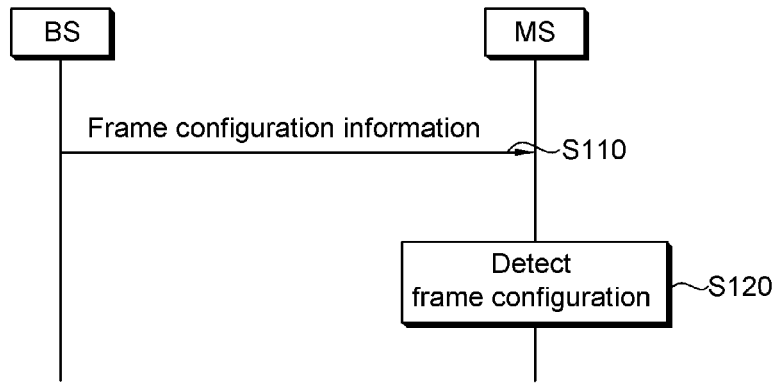
FIG. 6 is a flowchart illustrating an example of a method of transmitting frame configuration information.

FIG. 6 is a flowchart illustrating an example of a method of transmitting frame configuration information.

Referring to FIG. 6, a BS transmits frame configuration information to an MS in step S110. Frame configuration is common for all MSs in a cell, and thus the frame configuration information can be broadcasted. The frame configuration information may be included in a system configuration signal. The signal configuration signal may be a part of system information. Accordingly, the frame configuration information may be transmitted through a superframe header. The frame configuration information may be periodically transmitted. For example, the frame configuration information may be transmitted for every superframe or transmitted for every one or more superframes. Otherwise, the frame configuration information may be transmitted only when the frame configuration is changed.

The MS detects the frame configuration by using the frame configuration information in step S120. The MS can detect the time-frequency domain with respect to each of 16e DL, 16m DL, 16e UL and 16e UL in the frame. The MS may communicate with the BS by using 16e DL and 16e UL when the MS corresponds to a 16e MS. The MS may communicate with the BS by using 16m DL and 16m UL when the MS corresponds to a 16m MS.

The frame configuration information may include parameters determining the frame configuration. The frame configuration information may include the parameters determining the frame configuration, described with reference to Table 1. In this case, the frame configuration information may include parameters such as system type, multiplexing scheme, DL/UL ratio, 16e DL/16m DL/16e UL/16m UL ratio, etc. Each parameter may be signaled as at least one bit. The system type may be signaled as 1 bit and the multiplexing scheme may be signaled as 2 bits. For example, when the system type is signaled as '0' and the multiplexing scheme is signaled as '01' in the frame configuration information, it represents that multiplexing is performed according to DL TDM and UL FDM in the 16e/16m system.

To reduce the number of signaling bits of the frame configuration information, implicit mapping through quantization between the frame configuration information and the frame configuration may be used. In this case, it is possible to reduce signaling overhead of the frame configuration information and radio resources used to transmit the frame configuration information.

Figure 7:
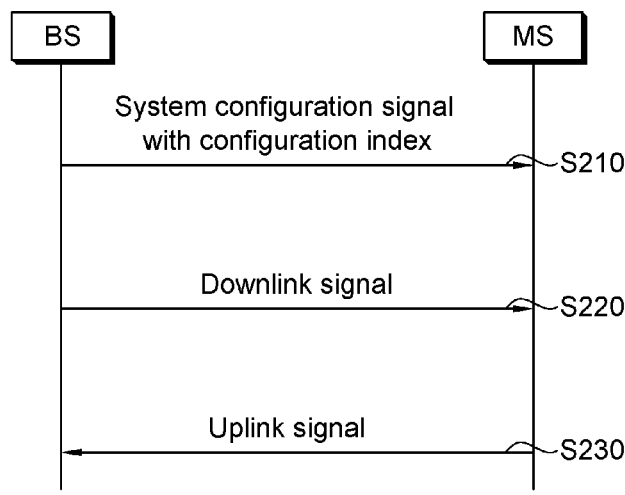
FIG. 7 is a flowchart illustrating an example of a method of transmitting a system configuration signal.

FIG. 7 is a flowchart illustrating an example of a method of transmitting a system configuration signal.

Referring to FIG. 7, a BS transmits a system configuration signal with a configuration index to an MS in step S210. The configuration index corresponds to frame configuration information. The MS detects the frame configuration through the configuration index. The BS transmits a downlink signal to the MS according to the frame configuration in step S220. The MS transmits an uplink signal to the BS according to the frame configuration in step S230.

The configuration index is selected from a frame configuration table that is a set of configuration indexes. The configuration indexes of the frame configuration table correspond to combinations of the parameters determining the frame configuration. That is, each of the configuration indexes corresponds to a specific frame configuration. The BS and the MS use the frame configuration table agreed in advance.

Table 4 represents an example of the frame configuration table. Table 4 is exemplary and the frame configuration table is not limited thereto. In Table 4, 'D' denotes 16m DL, 'U' denotes 16m UL, 'D' denotes 16e DL, and 'U' denotes 16e UL.

TABLE 4

| Configuration index | System | UL Multiplexing | Frame configuration |
|---|---|---|---|
| 0 | 16m | N/A | DDDDDDDU |
| 1 | 16m | N/A | DDDDDDUU |
| 2 | 16m | N/A | DDDDDUUU |
| 3 | 16m | N/A | DDDDUUUU |
| 4 | 16m | N/A | DDDUUUUU |
| 5 | 16m | N/A | DDUUUUUU |
| 6 | 16m | N/A | DUUUUUUU |
| 7 | 16m | N/A | DDUUDDUU |
| 8 | 16e/16m | TDM | DDDDDUUU |
| 9 | 16e/16m | TDM | DDDDDUUU |
| 10 | 16c/16m | TDM | DDDDDUUU |
| 11 | 16e/16m | TDM | DDDDDUUU |
| 12 | 16e/16m | TDM | DDDDUUUU |
| 13 | 16e/16m | TDM | DDDDUUUU |
| 14 | 16c/16m | FDM | DDDDDUUU |
| 15 | 16e/16m | FDM | DDDDDUUU |
| 16 | 16e/16m | FDM | DDDDUUUU |

Here, each of the configuration indexes in the frame configuration table corresponds to system type, UL multiplexing scheme and frame configuration. When the configuration indexes are integers from 0 to 16 as represented in Table 4, information on the configuration index can be signaled as 5 bits.

In the case of the configuration index 10, for example, the MS can detect that the system type is 16e/16m system, 16e UL and 16m UL are multiplexed according to TDM, a:b is 5:3, and w:x:y:z is 2:3:1:2 through the configuration index. When the MS corresponds to a 16e MS, the MS can receive the downlink signal through subframes 0 and 1 in a frame and transmit the uplink signal through subframe 5 in the frame. When the MS corresponds to a 16m MS, the MS can receive the downlink signal through subframes 2, 3 and 4 in the frame and transmit the uplink signal through subframes 6 and 7 in the frame.

As described above, the MS can detect the frame configuration only using the configuration index if the BS simply indicates only the configuration index. The MS can communicate with the BS according to the frame configuration. In this case, the configuration index corresponds to frame configuration information and signaling overhead with respect to the frame configuration information can be remarkably reduced. Furthermore, radio resources required to transmit the frame configuration information can be decreased.

The wireless communication system can support uplink and/or downlink HARQ.

Figure 8:
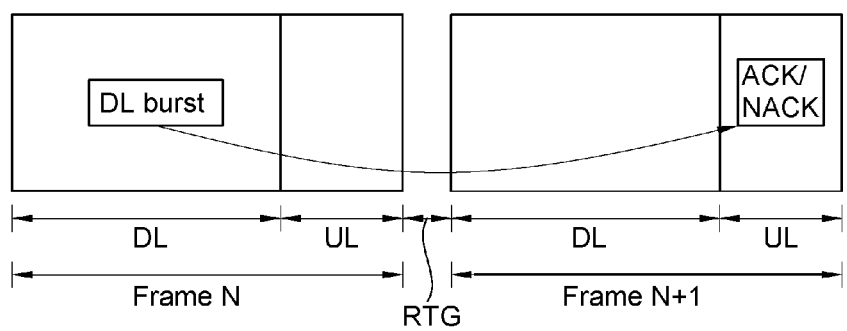
FIG. 8 illustrates an example of the structure of a frame used to transmit an uplink ACK/NACK signal in the 16e system.

FIG. 8 illustrates an example of the structure of a frame used to transmit an uplink ACK/NACK signal in the 16e system.

Referring to FIG. 8, each of the Frame N and the Frame N+1 includes downlink subframe and UL subframe. The transmission unit is a frame in the 16e system. A BS transmits a downlink data signal to an MS through a DL burst of the Frame N. An uplink ACK/NACK signal with respect to the downlink data signal is transmitted in the uplink subframe of the Frame N+1 which is the next frame to the Frame N.

Figure 9:
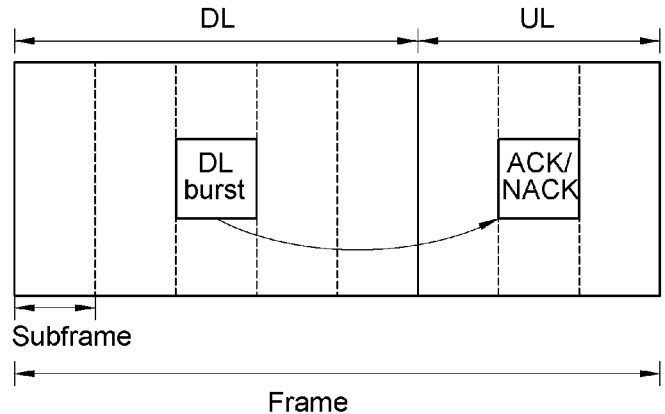
FIG. 9 illustrates an example of the structure of a frame used to transmit an uplink ACK/NACK signal in the 16m system.

FIG. 9 illustrates an example of the structure of a frame used to transmit an uplink ACK/NACK signal in the 16m system.

Referring to FIG. 9, one frame includes 5 downlink subframes and 3 UL subframes. The transmission unit is one or more subframes in the 16m system. A BS transmits a downlink data signal to an MS through a DL burst of subframe 2 in the frame. The uplink ACK/NACK signal with respect to the downlink data signal is transmitted in subframe 6 of the frame. While the downlink data signal and the uplink ACK/NACK signal are transmitted in different frames in the 16e system, the downlink data signal and the uplink ACK/NACK signal can be transmitted in the same frame in the 16m system. The 16m system can reduce a time from when a data signal is received to when an ACK/NACK signal is transmitted as compared to the 16e system. Accordingly, the data signal can be rapidly retransmitted.

The data signal is transmitted on a data channel and the ACK/NACK signal with respect to the data signal is transmitted on an ACK/NACK channel. For HARQ, the ACK/NACK channel must be associated with the data channel. That is, the data channel must be mapped to the ACK/NACK channel. At this time, it is required that a plurality of data channels and a plurality of ACK/NACK channels do not collide with each other. Mapping of the data channel to the ACK/NACK channel depends on the frame configuration.

In the 16e/16m system or the 16m system, a HARQ performing method according to the frame configuration becomes a problem because the 16e/16m system or the 16m system may have various frame configurations. Furthermore, mapping of a subframe transmitting a data signal to a subframe transmitting an ACK/NACK signal may differ depending on frame configuration. Accordingly, the BS and the MS are required to share a method of mapping a data channel to an ACK/NACK channel according to frame configuration in order to perform HARQ. Mapping of the data channel to the ACK/NACK channel can be considered as mapping between the subframe transmitting the ACK/NACK channel and the subframe transmitting the data channel.

A method of sharing the mapping method can be divided into two. Firstly, a method of mapping a data channel to an ACK/NACK channel for each of frame configurations may be agreed in advance between the BS and the MS. Secondly, the BS may explicitly notify the MS of the mapping method.

The first case where the method of mapping the data channel to the ACK/NACK channel for each of frame configurations is agreed in advance between the BS and the MS is explained.

Figure 10:
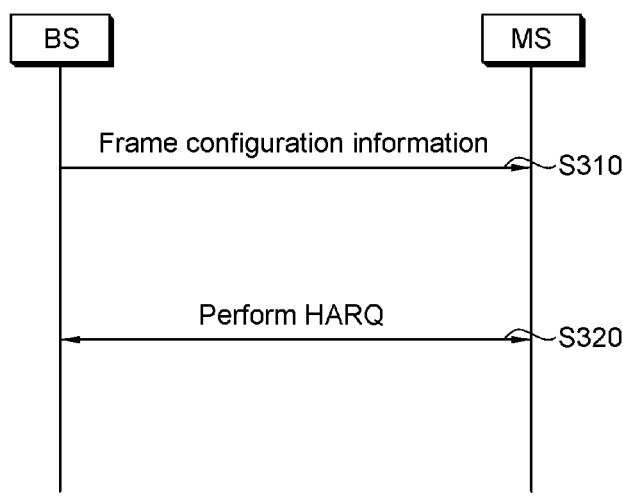
FIG. 10 is a flowchart illustrating an example of a method of performing HARQ.

FIG. 10 is a flowchart illustrating an example of a method of performing HARQ.

Referring to FIG. 10, a BS transmits frame configuration information to an MS in step S310. The MS detects a frame configuration through the frame configuration information. The MS can be aware of a method of mapping a data channel to an ACK/NACK channel by using the frame configuration information. That is, the MS implicitly knows the mapping method through the frame configuration information. The BS and the MS perform HARQ according to the frame configuration in step S320. The performed HARQ may be downlink HARQ or uplink HARQ.

Figure 11:
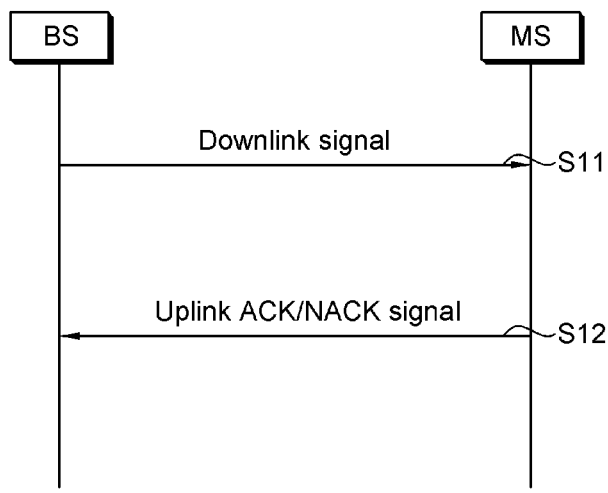
FIG. 11 is a flowchart illustrating an example of a method of performing downlink HARQ.

FIG. 11 is a flowchart illustrating an example of a method of performing downlink HARQ.

Referring to FIG. 11, a BS transmits a downlink signal to an MS according to the frame configuration in step S11. The MS transmits an uplink ACK/NACK signal with respect to the downlink signal to the BS according to the frame configuration in step S12. The MS that has detected the frame configuration may implicitly determine transmission timing of the uplink ACK/NACK signal with respect to the downlink signal.

The uplink ACK/NACK signal becomes an ACK signal when the downlink signal has been successfully decoded. The uplink ACK/NACK signal becomes a NACK signal when the downlink signal has not been decoded. Whether the downlink signal is successfully decoded can be determined using CRC (Cyclic Redundancy Check) corresponding to an error detection code. The MS determines that the downlink has been successfully decoded when an error in the downlink signal is not detected through a CRC detection process. The MS determines that the downlink signal has not been decoded when an error in the downlink signal is detected through the CRC detection process. The BS can retransmit the downlink signal when receiving the NACK signal with respect to the downlink signal.

Figure 12:
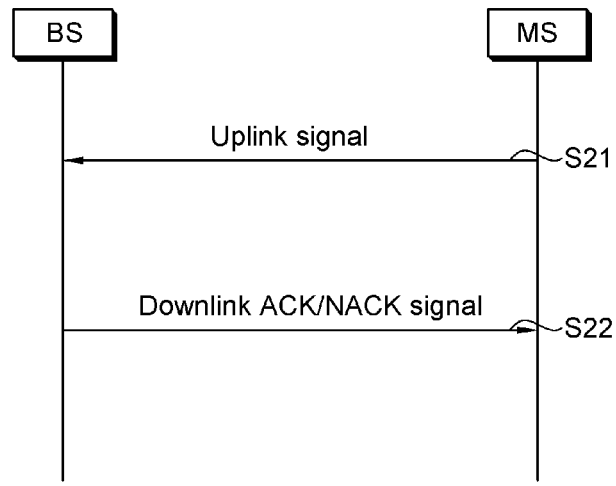
FIG. 12 is a flowchart illustrating an example of a method of performing uplink HARQ.

FIG. 12 is a flowchart illustrating an example of a method of performing uplink HARQ.

Referring to FIG. 12, an MS transmits an uplink signal to a BS according to a frame configuration in step S21. The BS transmits a downlink ACK/NACK signal with respect to the uplink signal to the MS according to the frame configuration in step S22. The method of performing uplink HARQ can employ the method of performing downlink HARQ explained with reference to FIG. 11.

Figure 13:
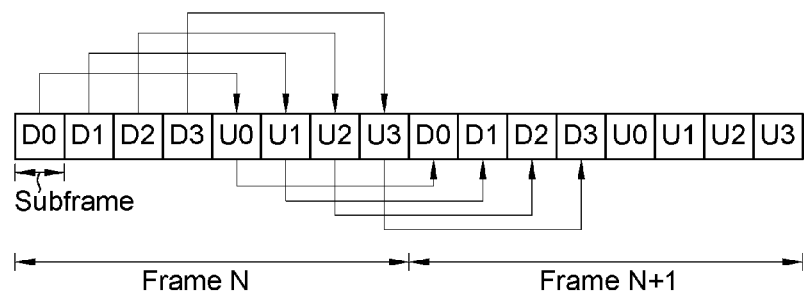
FIG. 13 illustrates an example of mapping of a subframe transmitting a data signal to a subframe transmitting an ACK/NACK signal when the ratio of the number of downlink subframes to the number of uplink subframes in a frame is 1:1.
Figure 14:
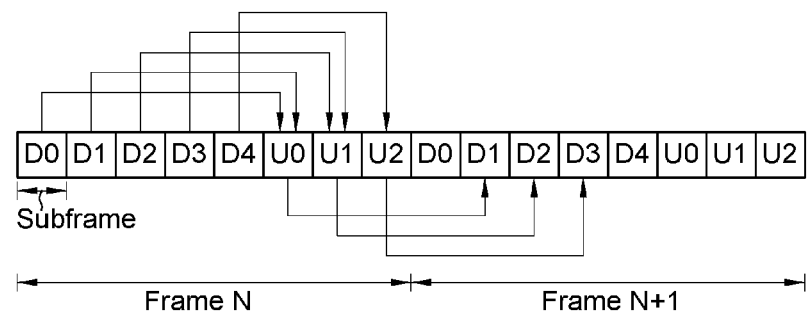
FIG. 14 illustrates an example of mapping of a subframe transmitting a data signal to a subframe transmitting an ACK/NACK signal when the ratio of the number of downlink subframes to the number of uplink subframes in a frame is 5:3.
Figure 15:
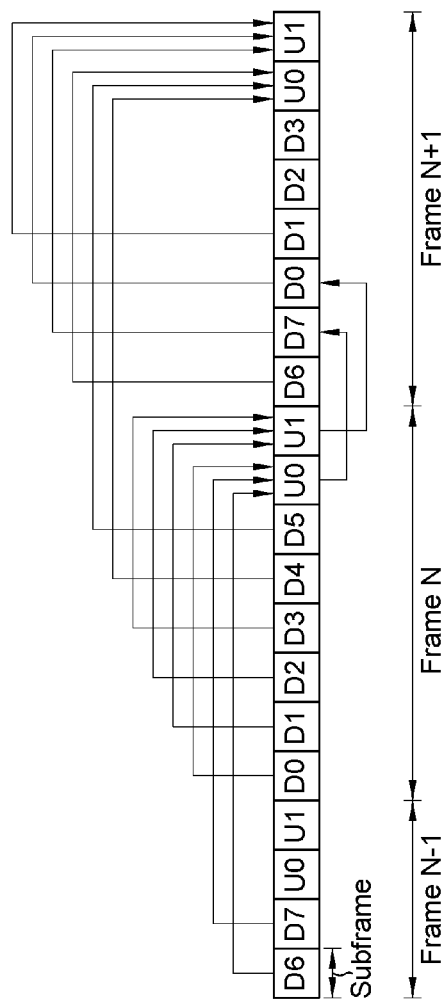
FIG. 15 illustrates an example of mapping of a subframe transmitting a data signal to a subframe transmitting an ACK/NACK signal when the ratio of the number of downlink subframes to the number of uplink subframes in a frame is 6:2.

Mapping methods agreed in advance between a BS and an MS for respective frame configurations will now be explained with reference to FIGS. 13, 14 and 15. FIGS. 13, 14 and 15 illustrate cases where a downlink region and an uplink region in a frame respectively include contiguous subframes. 'Dn' denotes the index of a downlink data channel and 'Un' denotes the index of an uplink data channel. Here, n is an integer. In FIGS. 13 and 14 except for FIG. 15, 'Dn' may represent a downlink subframe n in a frame and 'Un' may represent an uplink subframe n in the frame. It is desirable that the mapping methods are determined in consideration of the following points. First, ACK/NACK channels must be widely dispersed according to the DL/UL ratio in the frame. Second, it is required that a data signal initially transmitted in Dn (or Un) of the frame can be retransmitted in Dn (or Un) of the next frame. Third, mapping of a data channel to an ACK/NACK channel must consider delay. Delay includes propagation delay, transmission delay, processing delay, etc. The processing delay corresponds to a time required for the BS or the MS to process data. Only the processing delay is considered for convenience of explanations hereinafter. It is assumed that the processing delay corresponds to two subframes. This means that a subframe transmitting an ACK/NACK signal can be mapped to a subframe at least two subframes after a subframe transmitting a data signal.

FIG. 13 illustrates an example of mapping of a subframe transmitting a data signal to a subframe transmitting an ACK/NACK signal when the ratio of the number of downlink subframes to the number of uplink subframes in a frame is 1:1.

Referring to FIG. 13, each frame includes 4 downlink subframes and 4 uplink subframes in the time domain (DL:UL=4:4). Each of the downlink subframes is sequentially one-to-one mapped to each of the uplink subframes. An uplink ACK/NACK signal with respect to a downlink data signal transmitted in Dn of the Frame N is transmitted in Un of the Frame N (n=0, 1, 2, 3). That is, Un is associated with Dn in downlink HARQ. A downlink ACK/NACK signal with respect to an uplink data signal transmitted in Un of the Frame N is transmitted in Dn of the Frame N+1 (n=0, 1, 2, 3). That is, Dn of the Frame N+1 is associated with Un of the Frame N in uplink HARQ. For example, a BS transmits a downlink data signal to an MS in D0 of the Frame N. The MS transmits a NACK signal with respect to the downlink data signal to the BS in U0 of the Frame N associated with D0. The BS retransmits the downlink data signal to the MS in D0 of the Frame N+1.

Next, a case where the number of downlink subframes in a frame is greater than the number of uplink subframes in the frame will be explained.

Mapping of a downlink ACK/NACK channel to an uplink data channel is performed as follows. An uplink subframe can be mapped to one of downlink subframes after processing delay of a BS. Here, each of downlink subframes to which each of uplink subframes is mapped is different each other because the number of downlink subframes is greater than the number of uplink subframes. That is, the number of the downlink subframes to which uplink subframes is mapped is same as the number of the uplink subframes. For example, the first uplink subframe in a frame can be mapped to the first downlink subframe after processing delay of the BS. Uplink ACK/NACK channels can be sequentially one-to-one mapped to downlink subframes which the first downlink subframe heads.

Mapping of uplink ACK/NACK channels to downlink data channels is performed as follows. A downlink subframe may be mapped to one of uplink subframes after processing delay of an MS. Here, uplink ACK/NACK channels with respect to downlink subframe data channels are mapped such that the uplink ACK/NACK channels are evenly distributed in uplink subframes. Since the number of downlink subframes is greater than the number of uplink subframes, every uplink subframe in the frame is associated with at least one downlink subframe.

FIG. 14 illustrates an example of mapping of a subframe transmitting a data signal to a subframe transmitting an ACK/NACK signal when the ratio of the number of downlink subframes to the number of uplink subframes in a frame is 5:3.

Referring to FIG. 14, each frame includes 5 downlink subframes and 3 uplink subframes in the time domain (DL:UL=5:3).

Mapping downlink ACK/NACK channels to uplink data channels is performed as follows. U0 of the Frame N is mapped to D1 of the Frame N+1 which is the next frame to the Frame N, U1 of the Frame N is mapped to D2 of the Frame N+1, and U2 of the Frame N is mapped to D3 of the Frame N+1. This is exemplary. When processing delay corresponds to two subframes, U0 can be mapped to one of D0, D1 and D2 of the next frame. U1 can be mapped to one of downlink subframes following the downlink subframe to which U0 is mapped. For example, U1 can be mapped to the downlink subframe right after the downlink subframe to which U0 is mapped. U2 can be mapped to one of downlink subframes following the downlink subframe to which U1 is mapped. For example, U2 can be mapped to the downlink subframe right after the downlink subframe to which U1 is mapped.

Mapping of uplink ACK/NACK channels to downlink data channels is performed as follows. D0 and D1 are mapped to U0 in the same frame, D2 and D3 are mapped to U1 in the same frame, and D4 is mapped to U2 in the same frame. This is exemplary. Otherwise, D0 is mapped to U0, D1 and D2 are mapped to U1, and D3 and D4 are mapped to U2. Otherwise, D0 and D1 are mapped to U0, D2 is mapped to U1, and D3 and D4 are mapped to U2. That is, the 5 downlink subframes are mapped to the 3 uplink subframes in a ratio of 2:2:1, 1:2:2 or 2:1:2.

For instance, an MS transmits an uplink data signal to a BS in U0 of the Frame N. The BS transmits a NACK signal with respect to the uplink data signal to the MS in D1 of the Frame N+1. The MS retransmits the uplink data signal to the BS in U0 of the Frame N+1.

FIG. 15 illustrates an example of mapping of a subframe transmitting a data signal to a subframe transmitting an ACK/NACK signal when the ratio of the number of downlink subframes to the number of uplink subframes in a frame is 6:2.

Referring to FIG. 15, each frame includes 6 downlink subframes and 2 uplink subframes in the time domain (DL:UL=6:2). Subframes 0 through 5 are downlink subframes and subframes 6 and 7 are uplink subframes.

Mapping of downlink ACK/NACK channels to uplink data channels is performed as follows. Uplink data channel U0 of the Frame N is mapped to subframe 1 of the Frame N+1 and uplink data channel U1 of the Frame N is mapped to subframe 2 of the Frame N+1. This is exemplary. When processing delay corresponds to two subframes, U0 may be mapped to one of subframes 1 through 4 of the next frame. U1 may be mapped to one of downlink subframes following the downlink subframe to which U0 is mapped. For example, U1 can be mapped to the downlink subframe right after the downlink subframe to which U0 is mapped.

Mapping of uplink ACK/NACK channels to downlink data channels is performed as follows. When the 6 downlink subframes are mapped to the 2 uplink subframes in the ratio of 3:3, the downlink subframes are evenly distributed for the uplink subframes. When processing delay corresponds to two subframes, however, downlink data channel D5 of the Frame N cannot be mapped to an uplink subframe in the same frame. Accordingly, D5 is mapped to subframe 6 corresponding to the first uplink subframe of the Frame N+1. Downlink data channel D7 of the Frame N−1 is mapped to subframe 6 of the Frame N. Downlink data channel D4 of the Frame N−1 is mapped to subframe 6 of the Frame N+1. This is exemplary. D4 of the Frame N may be mapped to subframe 7 in the same frame. That is, D1, D2 and D3 of the Frame N are mapped to subframe 7 in the same frame and D6 and D7 of the Frame N−1 and D1 of the Frame N are mapped to subframe 6 of the Frame N.

For instance, a BS transmits a downlink data signal to an MS on downlink data channel D7 in the last downlink subframe of the Frame N−1. The MS transmits a NACK signal with respect to the downlink data signal in subframe 6 of the Frame N. The BS retransmits the downlink data signal on downlink data channel D7 in subframe 1 of the Frame N+1.

Next, a case where the number of downlink subframes in a frame is smaller than the number of uplink subframes in the frame will be explained.

Mapping of uplink ACK/NACK channels to downlink data channels is carried out as follows. A downlink subframe may be mapped to one of uplink subframes after processing delay of a BS. Here, each of uplink subframes to which each of downlink subframes is mapped is different each other because the number of downlink subframes is smaller than the number of uplink subframes. That is, the number of the uplink subframes to which downlink subframes is mapped is same as the number of the downlink subframes. For example, the first downlink subframe in a frame may be mapped to the first uplink subframe after the processing delay of the BS. Further, uplink ACK/NACK channels may be sequentially one-to-one mapped to uplink subframes which the first uplink subframe heads.

Mapping of downlink ACK/NACK channels to uplink data channels is carried out as follows. An uplink subframe may be mapped to one of downlink subframes after processing delay of an MS. Here, downlink ACK/NACK channels with respect to uplink subframe data channels are mapped such that the downlink ACK/NACK channels are evenly distributed in downlink subframes. Since the number of uplink subframes is greater than the number of downlink subframes, every downlink subframe in the frame is associated with at least one uplink subframe. If downlink and uplink substitute for each other in the description with respect to FIGS. 14 and 15, the description can be applied to the case where the number of downlink subframes in a frame is smaller than the number of uplink subframes in the frame. If downlink and uplink substitute for each other in the description with reference to FIG. 14, the description can be applied to a case where a frame includes 3 uplink subframes and 5 downlink subframes in the time domain (DL:UL=3:5). The description with reference to FIG. 15 can be applied to a case where the DL/UL ratio is 2:6 if downlink and uplink substitute for each other in the description.

The case where the method of mapping data channels to ACK/NACK channels for each frame configuration is agreed in advance between a BS and an MS has been explained. A case where a BS explicitly notifies an MS of the mapping method will now be explained. In this case, overhead of signaling for notifying the MS of the mapping method may occur. However, the mapping method can be appropriately varied according to channel condition, and thus HARQ can be flexibly performed.

Figure 16:
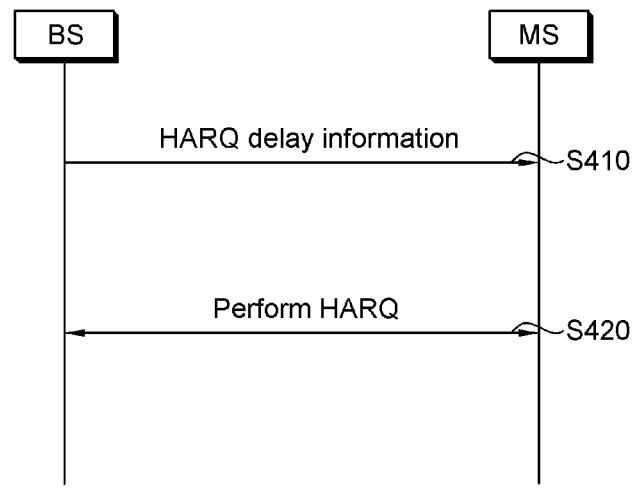
FIG. 16 is a flowchart illustrating another example of a method of performing HARQ.

FIG. 16 is a flowchart illustrating another example of a method of performing HARQ.

Referring to FIG. 16, a BS transmits HARQ delay information to an MS in step S410. The HARQ delay information indicates association of downlink subframes with uplink subframes in a frame for HARQ. That is, HARQ delay information indicates association of a subframe transmitting a data channel with a subframe transmitting an ACK/NACK channel mapped to the data channel. In the case of downlink HARQ, the HARQ delay information includes association of uplink subframes with downlink subframes for downlink HARQ.

The HARQ delay information may be a delay value for each subframe in a frame. An ACK/NACK signal with respect to a data signal transmitted in a first subframe is transmitted in a second subframe after the delay value from the first subframe. The HARQ delay information may be a value which is common for all MSs in a cell or specific for a specific MS. When the HARQ delay information is common for all the MSs in the cell, the HARQ delay information can be broadcasted. Here, the HARQ delay information can be included in the system configuration signal and transmitted to the MSs. Accordingly, the HARQ delay information can be transmitted through a superframe header. The HARQ delay information can be periodically transmitted. For example, the HARQ delay information may be transmitted for every superframe or every one or more superframes. Otherwise, the HARQ delay information may be transmitted only when varied.

The MS detects HARQ timing by using the HARQ delay information. The MS can be aware of the method of mapping data channels to ACK/NACK channels through the HARQ delay information. The MS can detect timing of transmitting an ACK/NACK signal with respect to a received downlink data signal. Further, the MS can detect timing of receiving an ACK/NACK signal with respect to a transmitted uplink data signal. The BS and the MS perform HARQ according to the HARQ timing in step S420. Each of the BS and the MS transmits or receives an ACK/NACK signal according to the HARQ timing. Further, each of the BS and the MS retransmit a data signal with respect to a NACK signal when receiving the NACK signal.

Figure 17:
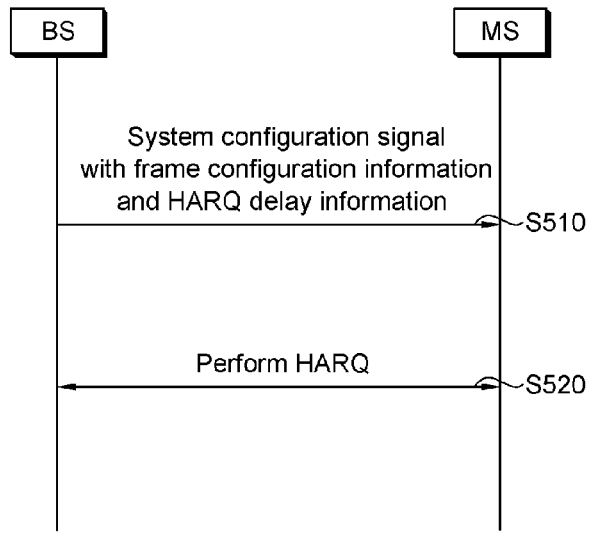
FIG. 17 is a flowchart illustrating still another example of a method of performing HARQ.

FIG. 17 is a flowchart illustrating still another example of a method of performing HARQ.

Referring to FIG. 17, a BS transmits a system configuration signal including frame configuration information and HARQ delay information to an MS in step S510. The MS can detect a frame configuration and HARQ timing for each subframe through the system configuration signal. The BS and the MS perform HARQ in step S520. The frame configuration information includes the DL/UL ratio in a frame. Here, the frame may include a plurality of downlink subframes and at least one uplink subframe.

Figure 18:
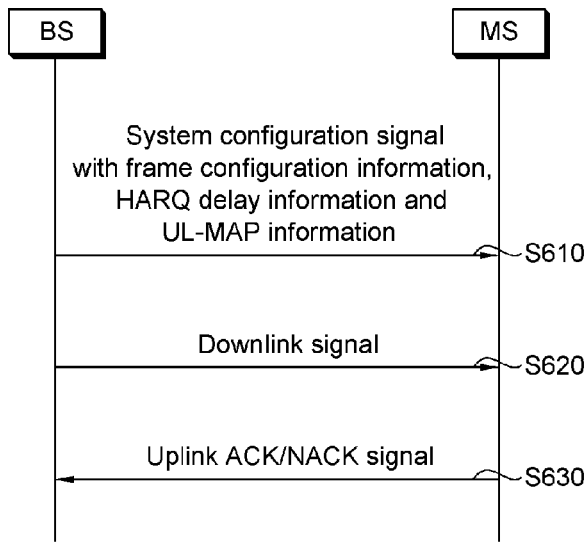
FIG. 18 is a flowchart illustrating still another example of a method of performing HARQ.

FIG. 18 is a flowchart illustrating still another example of a method of performing HARQ.

Referring to FIG. 18, a BS transmits a system configuration signal including frame configuration information, HARQ delay information and UL-MAP information to an MS in step S610. The MS receives a downlink signal from the BS in a downlink subframe in step S620. The MS transmits an ACK/NACK signal with respect to the downlink signal to the BS in step S630. Here, the uplink subframe transmitting the ACK/NACK signal is associated with the downlink subframe receiving the downlink signal.

The UL-MAP information includes information about an uplink subframe associated with UL-MAP included in a downlink subframe. The MS can detect a downlink subframe in which UL-MAP for each uplink subframe in a frame is transmitted through the UL-MAP information. The UL-MAP is a region for transmitting scheduling grant with respect to a uplink subframe. The UL-MAP information may be included in the system configuration signal and indicated to the MS through explicit signaling. Otherwise, the UL-MAP information may be agreed in advance between the BS and the MS according to the frame configuration. In this case, the MS can implicitly detect the uplink subframe associated with UL-MAP included in the downlink subframe after detecting the frame configuration.

Figure 19:
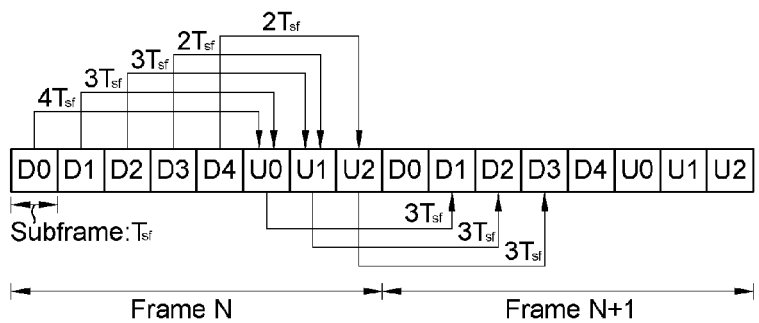
FIG. 19 illustrates an example of HARQ delay information.

FIG. 19 illustrates an example of HARQ delay information. 'Dn' denotes downlink subframe n in a frame and 'Un' denotes uplink subframe n in the frame.

Referring to FIG. 19, the unit of the HARQ delay information is an absolute time unit (for example, second, millisecond, etc.). It is assumed that the length of one subframe is $T_{sf}$. When HARQ delay information regarding a first subframe is $n \times T_{sf}$, an ACK/NACK channel with respect to the first subframe is mapped to a second subframe after $n \times T_{sf}$ from the first subframe. For example, HARQ delay information regarding U0 of the Frame N is $3T_{sf}$. An MS transmits an uplink data signal in U0. The MS receives an ACK/NACK signal with respect to the uplink data signal in subframe D1 after $3T_{sf}$ from U0.

Figure 20:
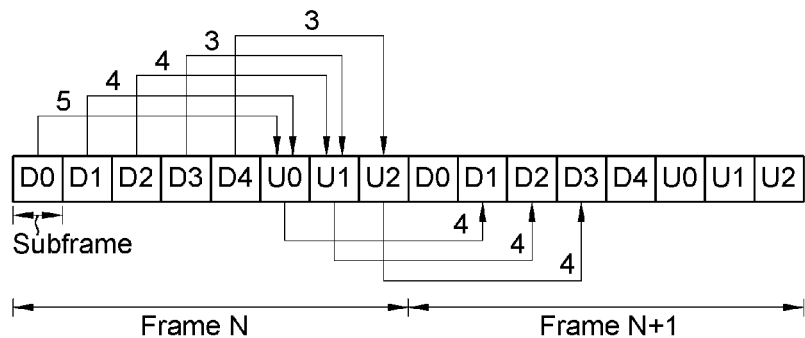
FIG. 20 illustrates another example of HARQ delay information.

FIG. 20 illustrates another example of HARQ delay information. 'Dn' denotes downlink subframe n in a frame and 'Un' denotes uplink subframe n in the frame.

Referring to FIG. 20, the unit of the HARQ delay information is a subframe unit. When HARQ delay information regarding a first subframe is n, an ACK/NACK channel with respect to the first subframe is mapped to the nth subframe from the first subframe. For example, when HARQ delay information regarding D1 of the Frame N is 4, the MS receives a downlink data signal in D1 and transmits an ACK/NACK signal with respect to the downlink data signal in subframe U0, the 4th subframes from D1.

As described above, an MS can implicitly detect HARQ timing for each subframe according to the frame configuration. Otherwise, an BS can transmit HARQ delay information to the MS to notify explicitly the MS of the HARQ timing for each subframe. The frame configuration information and the HARQ delay information may be transmitted through superframe headers. In this case, the HARQ timing for each subframe is maintained during a superframe. For flexibility of communication, HARQ timing of a specific subframe in a superframe, configured through the superframe header, can be one-time controlled if required. MAP message that defines access to a channel may be transmitted for every subframe. HARQ timing of a specific subframe may be varied through the MAP message. A HARQ field that instructs HARQ timing of a subframe to be changed may be configured in the MAP message. If the HARQ field is 1 bit, for example, HARQ timing of a subframe, configured through the superframe header, is not changed when the HARQ field is '0' and the HARQ timing is delayed by 1 subframe when the HARQ field is '1'.

A BS may notify an MS of frame configuration information, HARQ delay information and UL-MAP information for wireless communication. A configuration index can be used to reduce signaling overhead for notifying the MS of the aforementioned information.

Figure 21:
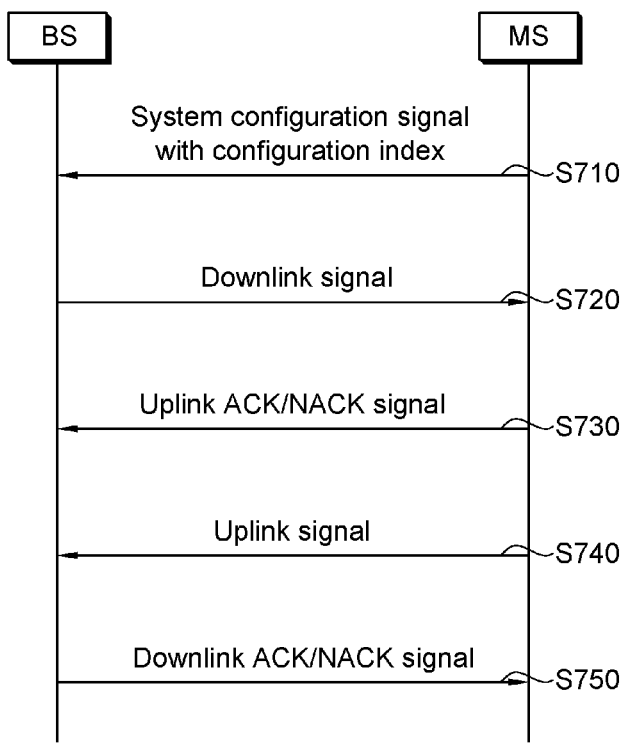
FIG. 21 is a flowchart illustrating still another example of a method of performing HARQ.

FIG. 21 is a flowchart illustrating still another example of a method of performing HARQ.

Referring to FIG. 21, a BS transmits a system configuration signal with a configuration index to an MS in step S710. The MS can detect frame configuration information, HARQ delay information or UL-MAP information by using the configuration index.

The configuration index is selected from a frame configuration table corresponding to a set of configuration indexes. Each of the configuration indexes in the frame configuration table corresponds to a combination of parameters determining the frame configuration, HARQ delay information or UL-MAP information. That is, each configuration index corresponds to a specific frame configuration and HARQ timing for each subframe. Further, each configuration index may correspond to a specific frame configuration and UL-MAP information. The BS and the MS use a frame configuration table agreed in advance.

Table 5 represents an example of a frame configuration table indicating downlink HARQ delay information k1. This is exemplary and the frame configuration table is not limited thereto. In Table 5, 'D' denotes 16m DL, 'U' denotes 16m UL, 'D' represents 16e DL, and 'U' represents 16e UL.

TABLE 5

| Conf. index | System | UL MUXing | Frame configuration | Subframe index(n) | | | | | | | |
|---|---|---|---|---|---|---|---|---|---|---|---|
| | | | | 0 | 1 | 2 | 3 | 4 | 5 | 6 | 7 |
| 0 | 16m | N/A | DDDDDDDU | | | | | | | | 3~5 |
| 1 | 16m | N/A | DDDDDDUU | | | | | | | 3~5 | 3~5 |
| 2 | 16m | N/A | DDDDDUUU | | | | | | 3~5 | 3~5 | 3~5 |
| 3 | 16m | N/A | DDDDUUUU | | | | | 4 | 4 | 4 | 4 |
| 4 | 16m | N/A | DDDUUUUU | | | | 5 | 4~5 | 3~5 | 3~4 | 3 |
| 5 | 16m | N/A | DDUUUUUU | | | 6 | 5 | 5 | 4 | 3 | 9 |
| 6 | 16m | N/A | DUUUUUUU | 7 | 6 | 5 | 4 | 3 | 10 | 9 | |
| 7 | 16m | N/A | DDUUDDUU | | | 3 | 5 | | | 3 | 5 |
| 8 | 16e/16m | TDM | DDDDDUUU | | | | | | | | 4~5 |
| 9 | 16e/16m | TDM | DDDDDUUU | | | | | | | 5 | 5 |
| 10 | 16e/16m | TDM | DDDDDUUU | | | | | | | 4~5 | 4~5 |
| 11 | 16e/16m | TDM | DDDDDUUU | | | | | | | | 3~5 |
| 12 | 16e/16m | TDM | DDDDDUUU | | | | | | | 4 | 4 |
| 13 | 16e/16m | TDM | DDDDUUUU | | | | | | | | 3~4 |
| 14 | 16e/16m | FDM | DDDDDUUU | | | | | | 5 | 5 | 5 |
| 15 | 16e/16m | FDM | DDDDDUUU | | | | | | 6~7 | 5~6 | 4~5 |
| 16 | 16e/16m | FDM | DDDDUUUU | | | | | 6~7 | 5~6 | 4~5 | 3~4 |

Here, each configuration index corresponds to a specific frame configuration and indicates downlink HARQ delay information k1 for each uplink subframe. A subframe index X can be represented as following equation. The subframe index X is the index of a subframe in which an ACK/NACK signal is transmitted, the ACK/NACK signal with respect to an uplink data signal transmitted in subframe n.

MathFIG. 1

$$X=(n+k1) \bmod 8 \quad \text{[Math. 1]}$$

Here, when subframe n is a subframe in the Frame N and n+k1 is greater than 8, subframe X denotes a subframe in the Frame N+1. Subframe X denotes a subframe in the Frame N+2 when n+k1 is greater than 16.

For instance, only subframe 7 is an uplink subframe in a frame if the configuration index is '0'. The HARQ delay value k1 of subframe 7 is one of 3, 4 and 5. X is 2 (10 mod 8), 3 (11 mode 8) or 4 (12 mod 8). An MS may transmit an uplink data signal to a BS in subframe 7 in a frame. The MS may receive an ACK/NACK signal with respect to the uplink data signal in subframe 2, subframe 3 or subframe 4 of the next frame.

Subframe n may have a plurality of HARQ delay values k1. In this case, the configuration index may be signaled such that one of the plurality of HARQ delay values is specified. When the configuration index is 0, the HARQ delay value k1 can be one of 3, 4 and 5. For example, a configuration index 0-0 may represent that the configuration index is 0 and the HARQ delay value k1 is 3, a configuration index 0-1 may represent that the configuration index is 0 and the HARQ delay value k1 is 4, and a configuration index 0-2 may represent that the configuration index is 0 and the HARQ delay value k1 is 5.

Table 6 represents an example of a frame configuration table indicating uplink HARQ delay information k2.

mation k2 for each downlink subframe. A subframe index X can be represented as following equation. The subframe index X is the index of a subframe in which an ACK/NACK signal is transmitted, the ACK/NACK signal with respect to an downlink data signal transmitted in subframe n.

MathFIG. 2

$$X=(n+k2) \bmod 8 \quad \text{[Math. 2]}$$

Here, when subframe n is a subframe in the Frame N and n+k2 is greater than 8, subframe X denotes a subframe in the Frame N+1. Subframe X denotes a subframe in the Frame N+2 when n+k2 is greater than 16.

For instance, only subframe 0 is a downlink subframe in a frame if the configuration index is '6'. The HARQ delay value k2 of subframe 0 is one of 3, 4 and 5. X is 3 (3 mod 8), 4 (4 mode 8) or 5 (5 mod 8). An MS may receive a downlink data signal from a BS in subframe 0 in a frame. The MS may transmit an ACK/NACK signal with respect to the downlink data signal in subframe 3, subframe 4 or subframe 5 of the frame.

Table 7 represents an example of a frame configuration table indicating UL-MAP information k3 with respect to subframe n corresponding to an uplink subframe. The UL-

TABLE 6

| Conf. index | UL System | MUXing | Frame configuration | Subframe index(n) | | | | | | | |
|---|---|---|---|---|---|---|---|---|---|---|---|
| | | | | 0 | 1 | 2 | 3 | 4 | 5 | 6 | 7 |
| 0 | 16m | N/A | DDDDDDDU | 7 | 6 | 5 | 4 | 3 | 10 | 9 | |
| 1 | 16m | N/A | DDDDDDUU | 6 | 5 | 5 | 4 | 3 | 9 | | |
| 2 | 16m | N/A | DDDDDUUU | 5 | 4~5 | 3~5 | 3~4 | 3 | | | |
| 3 | 16m | N/A | DDDDUUUU | 4 | 4 | 4 | 4 | | | | |
| 4 | 16m | N/A | DDDUUUUU | 3~5 | 3~5 | 3~5 | | | | | |
| 5 | 16m | N/A | DDUUUUUU | 3~5 | 3~5 | | | | | | |
| 6 | 16m | N/A | DUUUUUUU | 3~5 | | | | | | | |
| 7 | 16m | N/A | DDUUDDUU | 3 | 5 | | | 3 | 5 | | |
| 8 | 16e/16m | TDM | DDDDDUUU | | | | | 4 | 3 | | |
| 9 | 16e/16m | TDM | DDDDDUUU | | | | | 3 | 3 | | |
| 10 | 16e/16m | TDM | DDDDDUUU | | | 4~5 | 3~4 | 3 | | | |
| 11 | 16e/16m | TDM | DDDDDUUU | | | 5 | 4 | 3 | | | |
| 12 | 16e/16m | TDM | DDDDDUUU | | | 4 | 4 | | | | |
| 13 | 16e/16m | TDM | DDDDDUUU | | | 5 | 4 | | | | |
| 14 | 16e/16m | FDM | DDDDDUUU | | | 3 | 3 | 3 | | | |
| 15 | 16e/16m | FDM | DDDDDUUU | | | | | 3 | 3 | | |
| 16 | 16e/16m | FDM | DDDDUUUU | | | 3~5 | 3~4 | | | | |

Here, each configuration index corresponds to a specific frame configuration and indicates uplink HARQ delay infor- MAP information k3 indicates a subframe in which UL-MAP with respect to an uplink subframe is located.

TABLE 7

| Conf. index | UL System | MUXing | Frame configuration | Subframe index(n) | | | | | | | |
|---|---|---|---|---|---|---|---|---|---|---|---|
| | | | | 0 | 1 | 2 | 3 | 4 | 5 | 6 | 7 |
| 0 | 16m | N/A | DDDDDDDU | | | | | | | | 3~5 |
| 1 | 16m | N/A | DDDDDDUU | | | | | | | 3~5 | 3~5 |
| 2 | 16m | N/A | DDDDDUUU | | | | | | 3~5 | 3~5 | 3~5 |
| 3 | 16m | N/A | DDDDUUUU | | | | | 4 | 4 | 4 | 4 |
| 4 | 16m | N/A | DDDUUUUU | | | | 3 | 3~4 | 3~5 | 4~6 | 5~7 |
| 5 | 16m | N/A | DDUUUUUU | | | 9 | 10 | 4 | 5 | 6 | 6 |
| 6 | 16m | N/A | DUUUUUUU | | 9 | 10 | 3 | 4 | 5 | 6 | 7 |
| 7 | 16m | N/A | DDUUDDUU | | | 5 | 3 | | | 5 | 3 |
| 8 | 16e/16m | TDM | DDDDDUUU | | | | | | | | 3~4 |
| 9 | 16e/16m | TDM | DDDDDUUU | | | | | | | 3 | 3 |
| 10 | 16e/16m | TDM | DDDDDUUU | | | | | | | 3~4 | 3~5 |
| 11 | 16e/16m | TDM | DDDDDUUU | | | | | | | | 3~5 |
| 12 | 16e/16m | TDM | DDDDUUUU | | | | | | | 4 | 4 |

TABLE 7-continued

| Conf. index | System | UL MUXing | Frame configuration | 0 | 1 | 2 | 3 | 4 | 5 | 6 | 7 |
|---|---|---|---|---|---|---|---|---|---|---|---|
| 13 | 16e/16m | TDM | DDDDUUUU | | | | | | | | 4~5 |
| 14 | 16e/16m | FDM | DDDDDUUU | | | | | | 3 | 3~4 | 3~5 |
| 15 | 16e/16m | FDM | DDDDDUUU | | | | | | 9 | 3 | 3 |
| 16 | 16e/16m | FDM | DDDDUUUU | | | | | 9 | 3 | 3~4 | 4~5 |

Here, each configuration index corresponds to a specific frame configuration and indicates UL-MAP information k3 for each uplink subframe. A subframe index X can be represented as following equation. The subframe index X is the index of a subframe in which UL-MAP regarding uplink signal transmission in subframe n is located.

MathFIG. 3

$$X = (n-k3) \bmod 8 \quad \text{[Math. 3]}$$

Here, when subframe n is a subframe in the Frame N and n−k3 is less than −1, subframe X denotes a subframe in the Frame N−1 prior to the Frame N. Subframe X denotes a subframe in the Frame N−2 when n−k3 is less than −9.

For instance, UL-MAP information k3 of subframes 4, 5, 6 and 7 is 4. X with respect to subframe 4 is 0 (0 mod 8). Accordingly, an MS receives a UL-MAP message with respect to subframe 4 through subframe 0. A UL-MAP message with respect to subframe 5 is transmitted through subframe 1. A UL-MAP message with respect to subframe 6 is transmitted through subframe 2. A UL-MAP message with respect to subframe 7 is transmitted through subframe 3.

Tables 4, 5, 6 and 7 can be independently applied to a system. Otherwise, Tables 4, 5, 6 and 7 can be applied as one set.

As described above, an MS can detect a frame configuration and communicate with a BS. Furthermore, the MS can perform HARQ according to the detected frame configuration. When signaling overhead of the frame configuration information is reduced, decoding complexity and power consumption of the MS can be decreased. Accordingly, the overall performance of a system can be improved.

Figure 22:
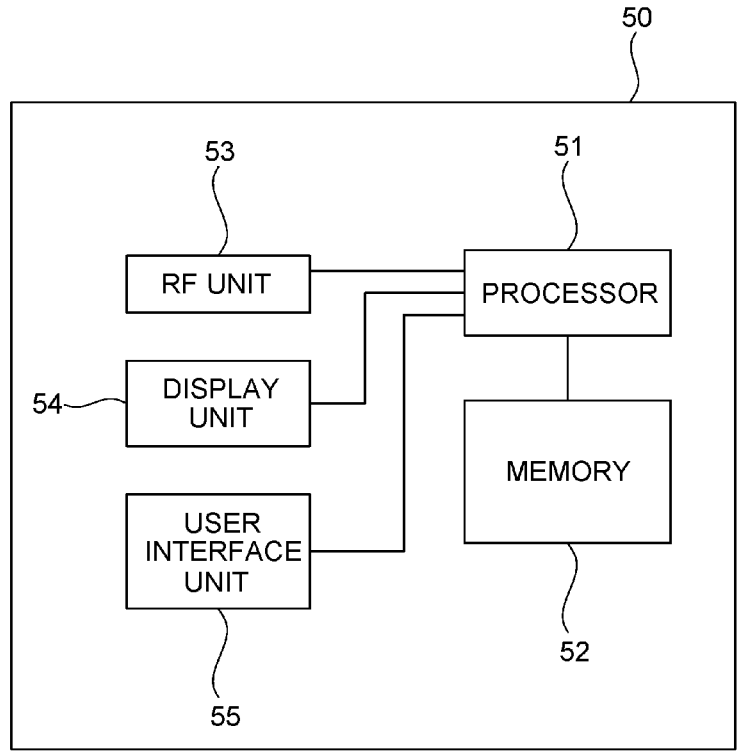
FIG. 22 is a block diagram of an apparatus for a wireless communication.

FIG. 22 is a block diagram of an apparatus for a wireless communication. An apparatus 50 for a wireless communication may be a part of an MS. The apparatus 50 includes a processor 51, a memory 52, an RF (Radio Frequency) unit 53, a display unit 54, and a user interface unit 55. The RF unit 53 is coupled with the processor 51, and configured to transmit and/or receive a radio signal. The memory 52 is coupled with the processor 51 and configured to store a driving system, applications and general files. The display unit 54 displays information on the MS and may use a well-known element such as LCD (Liquid Crystal Display), OLED (Organic Light Emitting Diodes), etc. The user interface 55 may be implemented by a combination of user interfaces such as keypad, touch screen, etc. The processor 51 performs all the aforementioned operations including the operation of detecting the frame configuration and the operation of performing HARQ.

Figure 23:
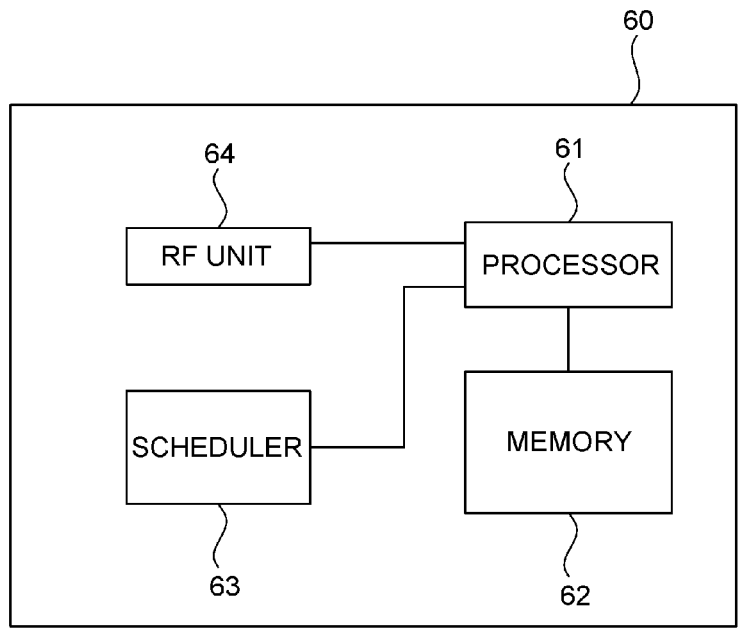
FIG. 23 is a block diagram of a base station (BS).

FIG. 23 is a block diagram of a BS. A BS 60 includes a processor 61, a memory 62, a scheduler 63, and an RF unit 64. The RF unit 64 is coupled with the processor 61 and configured to transmit and/or receive a radio signal. The processor 61 can carry out all the above-described methods including the operation of transmitting the system configuration signal and the operation of performing HARQ. The memory 62 is coupled with the processor 61 and configured to store information processed by the processor 61. The scheduler 63 is coupled with the processor 61 and can perform all the aforementioned methods associated with scheduling according to the frame configuration and scheduling for performing HARQ.

All functions described above may be performed by a processor such as a microprocessor, a controller, a microcontroller, and an application specific integrated circuit (ASIC) according to software or program code for performing the functions. The program code may be designed, developed, and implemented on the basis of the descriptions of the present invention, and this is well known to those skilled in the art.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of performing hybrid automatic repeat request (HARQ) in a wireless communication system, carried in a mobile station (MS), the method comprising:
   receiving a system configuration signal,
   wherein the system configuration signal comprises frame configuration information and HARQ delay information,
   wherein the frame configuration information comprises a ratio of a plurality of downlink (DL) subframes to at least one uplink (UL) subframe in a frame,
   wherein the frame comprises only 8 subframes and at least one subframe in the frame is an UL subframe,
   wherein each subframe in the frame comprises a plurality of orthogonal frequency division multiplexing (OFDM) symbols,
   wherein a number of the OFDM symbols of at least one subframe in the frame is different from a number of the OFDM symbols of the other subframes in the frame,
   wherein the plurality of DL subframes and the at least one UL subframe are allocated at different times in the frame,
   wherein the HARQ delay information comprises an association between the at least one UL subframe and at least one DL subframe in the plurality of DL subframes for HARQ,
   wherein the HARQ delay information further comprises a delay value indicating the association between the at least one UL subframe and the at least one DL subframe,
   wherein the delay value is represented by an absolute time unit, and wherein every UL subframe in the frame is associated with the at least one DL subframe;

receiving a DL signal in the at least one DL subframe; and transmitting an acknowledgement (ACK)/not-acknowledgement (NACK) signal for the DL signal in a corresponding UL subframe that is associated with the at least one DL subframe in which the DL signal is received.

2. The method of claim 1, wherein the system configuration signal is received as a part of system information.

3. The method of claim 2, wherein the system information is received through a superframe header.

4. The method of claim 1, wherein the system configuration signal further comprises UL-MAP information, the UL-MAP information comprising information about an UL subframe associated with an UL-MAP included in one of the plurality of DL subframes.

5. An apparatus for wireless communication, the apparatus comprising:

a radio frequency (RF) unit for receiving and transmitting a radio signal; and a processor coupled with the RF unit or:

receiving a system configuration signal, wherein the system configuration signal comprises frame configuration information and hybrid automatic repeat request (HARQ) delay information, wherein the frame configuration information comprises a ratio of a plurality of downlink (DL) subframes to at least one uplink (UL) subframe in a frame, wherein the frame comprises only 8 subframes and at least one subframe in the frame is an UL subframe, wherein each subframe in the frame comprises a plurality of orthogonal frequency division multiplexing (OFDM) symbols, wherein a number of the OFDM symbols of at least one subframe in the frame is different from a number of the OFDM symbols of the other subframes in the frame, wherein the plurality of DL subframes and the at least one UL subframe are allocated at different times in the frame, wherein the HARQ delay information comprises an association between the at least one UL subframe and at least one DL subframe in the plurality of DL subframes for HARQ, wherein the HARQ delay information further comprises a delay value indicating the association between the at least one UL subframe and the at least one DL subframe, wherein the delay value is represented by an absolute time unit, and wherein every UL subframe in the frame is associated with the at least one DL subframe;

receiving a DL signal in the at least one DL subframe; and transmitting an acknowledgement (ACK)/not-acknowledgment (NACK) signal for the DL signal in a corresponding UL subframe that is associated with the at least one DL subframe in which the DL signal is received.

* * * * *